July 29, 1930.  H. H. HOPKINS  1,771,538
COATED PRODUCT
Filed March 30, 1927
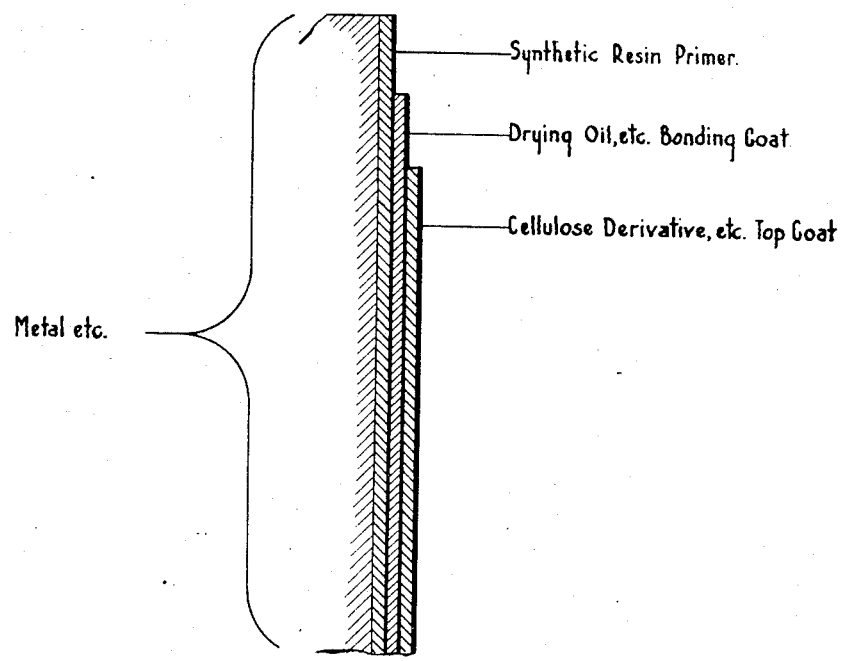
Horace H Hopkins    Inventor
By his attorney Patented July 29, 1930

1,771,538

UNITED STATES PATENT OFFICE

HORACE H. HOPKINS, OF WILMINGTON, DELAWARE, ASSIGNOR TO E. I. DU PONT DE NEMOURS & COMPANY, OF WILMINGTON, DELAWARE, A CORPORATION OF DELAWARE

COATED PRODUCT

Application filed March 30, 1927. Serial No. 179,713.

This invention relates to a coated article and to a process of building up a complete coating on the surface of the article by the successive application of a plurality of different coats. More particularly, it comprises applying to the surface to be coated, as a priming coating, prior to the application of the succeeding coat or coats, one or more coats of a mixed ester coating composition, the mixed ester having as its alcohol component, a polyhydric alcohol, and as the acid components a polybasic acid, and acids obtainable by the hydrolysis of drying oil, with or without natural resin acids, all as more fully hereinafter set forth and as claimed.

In building up a complete coating on the surface of an article, and particularly an article having metal surfaces such as that of sheet metal automobile bodies and the like, it has been found that the coatings do not always adhere properly to the surfaces to which they are applied without the use of a suitable undercoat or primer coat. The primer coat which has been used most often in the past has been of the drying oil type, but the oil type undercoats are objectionable in that they are slow drying and are readily lifted by succeeding coats such as, for instance, nitrocellulose or pyroxylin enamels. Pyroxylin undercoats have been advocated on the basis of their quick drying qualities, but their use has not met with wide application due to the brittleness of the undercoat and to its poor adhesion as compared with the oil type compositions.

It is an object of this invention to improve the application of a complete coating to the surface of an article to obtain a tightly adhering coating. It is a more specific object to provide a complete coating, the several coats making up said complete coating all having the property of quick drying without sacrifice of the desired adhesion, flexibility and durability. Other objects will be apparent from the specification.

The above objects are obtained by applying to the surface of an article to be coated, as a primer or anchoring coating, one or more coats of a mixed ester coating composition, said mixed ester, for example, having as the alcohol component a polyhydric alcohol, and as the acid components a polybasic acid and acids obtainable by the hydrolysis of drying oil, with or without natural resin acids; and applying over this primer coating, when dried, one or more coats of suitable surfacing or finishing coats.

The accompanying drawing forming part of the specification illustrates diagrammatically a fragmentary and sectional view of one specific embodiment of the invention. The legends on the drawing indicate the nature of the features illustrated.

More specifically, the following is given as an example of a suitable undercoat or primer composition, it being understood that it is merely illustrative:

| | Parts |
|---|---|
| Mixed ester | 25 |
| Pigments | 50 |
| Solvent | 25 |
| Total | 100 |

The mixed esters which form the basis of the primer, or anchoring composition, are in the nature of synthetic resins and have as the alcohol component a polyhydric alcohol, and as the acid components a polybasic acid and acids obtainable by the hydrolysis of drying oils, with or without natural resin acids. These synthetic resins may include any of the mixed esters falling within the general description thereof, and more particularly it has been found that the esters described in copending application of Horace H. Hopkins and Frank A. McDermott, Serial No. 129,286, are well adapted to use according to the present invention. As specific esters which I have found desirable for use in my coating composition may be mentioned the following:

Example 1. A mixed ester containing one mol glycerol, one mol phthalic anhydride, and one mol linseed oil acids.

Example 2. A mixed ester containing one mol glycerol, one mol phthalic anhydride, one-half mol linseed oil acids, and one-half mol Chinawood oil acids.

Example 3. A mixed ester made by combining 92 parts by weight of glycerol, 148 parts phthalic anhydride, 142 parts linseed oil acids of acid number 197, and 175 parts of rosin of acid number 160.

Example 4. A mixed ester made by combining 87 parts by weight of glycerol, 148 parts of phthalic anhydride, 140 parts of Chinawood oil and 175 parts of rosin of acid number 160.

Example 5. A mixed ester made by combining 40 parts by weight of ethylene glycol, 100 parts phthalic anhydride and 200 parts of linseed oil.

The resins may be varied widely by forming them from the various polyhydric alcohols and by varying the polybasic acids and drying oil acids. The natural resin acids, when included in the mixed esters, may also be varied within wide limits. The relative proportions in which the various components are combined to form the mixed ester also may be varied to a large extent.

As described in said co-pending application Serial No. 129,286, the polyhydric alcohols which may be used in place of glycerol may be glycols, mannitol, or polyglycerols; in place of phthalic acid may be used other polybasic acids or anhydrides thereof, for example, succinic acid, mallic acid, maleic acid, fumaric acid, tartaric acid, or citric acid; in place of linseed oil or Chinawood oil, there may be used perilla oil, soya bean oil, or fish oil as the sources of the drying oil acids; and among the natural resins which may be used may be mentioned rosin, copal and the fossil resins which are of an acidic nature and whose acid number is not less than 50.

The undercoat composition may be made up in any suitable manner as, for instance, by dissolving the mixed ester in a suitable solvent and grinding this solution with the pigment. Any suitable pigments may be used in making up the compositions or, if desired, the pigment may be left out entirely for certain purposes. Among the pigments which are adapted for use in the compositions, may be mentioned lithopone, iron oxides, talc, silica, carbon black and other pigments commonly used in undercoat practice. Suitable metallic driers may be used if desired.

The mixed esters which are used in the present invention are soluble in practically all common organic solvents, with the exception of some of the alcohols in which they may be only slightly soluble. Any desired solvents may be employed in making up the compositions and the proportions, as well as the nature of the solvents used, may be varied to comply with the specific operating conditions desired. Aliphatic hydrocarbons such as benzene are particularly suitable as solvents, because of their volatility and comparatively low cost.

The primer coating composition may be applied to the surface to be coated in any suitable manner, such as by flowing, dipping or spraying, and the applied coat may be dried, subsequently, at room temperatures or may be dried at elevated temperatures. Elevated temperatures are usually preferred, since a much more rapid set-up is obtained at the higher temperatures and the application of succeeding coats is facilitated. If desired, several primer coats may be applied to form the primer coating.

After the primer coating is applied to the surface and dried, the complete coating is built up by applying over the primer coating the desired number and kind of succeeding coats. These top coats may consist of compositions having any suitable ingredients, and may be of the drying oil type or may contain a gelatinizable derivative of cellulose, such as pyroxylin and other cellulose esters, or ethyl cellulose and other cellulose ethers, or mixtures of these. The compositions may also contain more or less of the mixed esters used in the primer coating compositions. The invention is particularly applicable to use with top coats or coats of a pyroxylin lacquer or lacquer-enamel, since this combination of coats gives a complete coating, the respective coats of which all have the property of quick drying without any sacrifice of adhesion and other desirable properties. A suitable pyroxylin lacquer-enamel may be made of the following ingredients, but it may vary greatly in composition and is, by no means, limited to the following specific example, which is merely illustrative:

| | |
|---|---|
| Low viscosity pyroxylin | 10 parts by weight |
| Resins (natural and/or synthetic) | 4 parts by weight |
| Softener | 5 parts by weight |
| Pigment | 3 to 15 parts by weight |
| Solvents | Any quantity sufficient for method of application. |

In building up a complete coating with the primer coat described, and with a pyroxylin lacquer or lacquer-enamel top coat, it has been found desirable, at times, to apply to the primer coating, prior to the application of the top coating, a surfacer or bonding coating to give a bonding surface between the primer and the top coat of pyroxylin lacquer or lacquer-enamel. This bonding coat may be either of the oil or pyroxylin type. The bonding coat composition used may consist of any of the well known drying oil or pyroxylin type coating compositions containing drying oil, pigment, drier, thinner, resins, etc., or the pyroxylin composition may contain nitrocellulose of suitable properties, pigment, thinner, softeners, plasticisers, resins, modified drying oils, etc., all of which is well known and susceptible of wide variation depending upon the properties desired. In coating the metal bodies of automobiles, it has been found that a complete coating, containing a mixed ester primer coat, a drying oil bonding coat, and a pyroxylin lacquer or lacquer-enamel top coat, gives an almost ideal finish to these articles. The coating is highly adherent, is easily and quickly applied, retains a high degree of flexibility and in durability is of a superior nature. The present invention, however, is not limited to the specific combination of coats just described, but it has been found that with the primer coat of the present invention and succeeding coats of a different nature, it is possible to obtain a great variety of coatings which have, to a high degree, the desirable qualities set forth.

The coating compositions described are applicable to substantially any type of surface, but they have been found to be particularly valuable for metal surfaces, for the reasons already pointed out.

Any suitable variations may be made in details described without departing from the spirit and scope of the invention as set forth in the claims. Wherever I have used the term lacquer, I intend it in its broad sense to include clear or pigment-containing compositions such as clear lacquers, lacquer-enamels, etc.

I claim:

1. Sheet metal carrying a tightly adhering coating, comprising as the primer coat a mixed ester having as the alcohol component a polyhydric alcohol and as the acid components a polybasic acid and acids obtainable by the hydrolysis of a drying oil, and over the primer coat a coating of a composition differing from that of the primer coat.

2. An article of manufacture carrying a tightly adhering coating comprising as the primer coat a mixed ester, having as the alcohol component a polyhydric alcohol and as the acid components a polybasic acid and acids obtainable by the hydrolysis of a drying oil, over the primer coat a bonding coating and over the bonding coating a coating containing a gelatinizable derivative of cellulose.

3. Sheet metal carrying a tightly adhering coating comprising as the primer coat a mixed ester having as the alcohol component a polyhydric alcohol and as the acid components a polybasic acid and acids obtainable by the hydrolysis of a drying oil, and over the primer coat a coating of pyroxylin lacquer.

4. Sheet metal carrying a tightly adhering coating comprising as the primer coat a mixed ester having as the alcohol component a polyhydric alcohol and as the acid components a polybasic acid, a natural resin acid and acids obtainable by the hydrolysis of a drying oil, and over the primer coat a coating of pyroxylin lacquer.

5. Sheet metal carrying a tightly adhering coating comprising as the primer coat a mixed ester of glycerine having as the acid components a polybasic acid and acids obtainable by the hydrolysis of a drying oil, and over the coat a coating of pyroxylin lacquer.

6. Sheet metal carrying a tightly adhering coating comprising as the primer coat a mixed ester of glycerine having as the acid components a polybasic acid, a natural resin acid and acids obtainable by the hydrolysis of a drying oil, and over the primer a coating of pyroxylin lacquer.

7. Sheet metal carrying a tightly adhering coating comprising as the primer coat a mixed ester of glycerine, phthalic acid and drying oil acids, and over the primer coat a coating of pyroxylin lacquer.

8. Sheet metal carrying a tightly adhering coating comprising as the primer coat a mixed ester of glycerine, polybasic acid and drying oil acids, a drying-oil-type bonding coat and a pyroxylin lacquer top coat.

9. An article of manufacture carrying a tightly adhering coating, comprising as the primer coating a mixed ester having as the alcohol component a polyhydric alcohol and as the acid components a polybasic acid and acids obtainable by the hydrolysis of a drying oil, and over the primer coating a coating of a composition differing from that of the primer coating.

10. An article of manufacture carrying a tightly adhering coating comprising as the primer coating a mixed ester having as the alcohol component a polyhydric alcohol and as the acid components a polybasic acid and acids obtainable by the hydrolysis of a drying oil, and over the primer coating a coating of pyroxylin lacquer.

11. An article of manufacture carrying a tightly adhering coating comprising as the primer coat a mixed ester having as the alcohol component a polyhydric alcohol and as the acid components a polybasic acid, a natural resin acid and acids obtainable by the hydrolysis of a drying oil, and over the primer coat a coating of pyroxylin lacquer.

12. An article of manufacture carrying a tightly adhering coating comprising as the primer coat a mixed ester of glycerine having as the acid components a polybasic acid and acids obtainable by the hydrolysis of a drying oil, and over the coat a coating of pyroxylin lacquer.

13. An article of manufacture carrying a tightly adhering coating comprising as the primer coating a mixed ester of glycerine having as the acid components a polybasic acid, a natural resin acid and acids obtainable by the hydrolysis of a drying oil, and over the primer a coating of pyroxylin lacquer.

14. An article of manufacture carrying a tightly adhering coating comprising as the primer coating a mixed ester of glycerine, polybasic acid and drying oil acids, a drying-oil-type bonding coat and a pyroxylin lacquer top coat.

15. An article of manufacture carrying a tightly adhering coating, including a primer coating comprising a mixed ester which has as the alcohol component a polyhydric alcohol and as the acid components a polybasic acid and a member of the group which consists of acids obtainable by the hydrolysis of a drying oil and a drying oil containing such acids, and over the primer coating a coating of a composition differing from that of the primer coating.

16. Sheet metal carrying a tightly adhering coating, including a primer coating comprising a mixed ester which has as the alcohol component a polyhydric alcohol and as the acid components a polybasic acid and a member of the group which consists of acids obtainable by the hydrolysis of a drying oil and a drying oil containing such acids, and over the primer coating a coating of a composition differing from that of the primer coating.

In testimony whereof I affix my signature.

HORACE H. HOPKINS.